United States Patent [19]

Kerr, III

[11] Patent Number: 4,902,578
[45] Date of Patent: Feb. 20, 1990

[54] RADIATION-CURABLE COATING FOR THERMOPLASTIC SUBSTRATES

[75] Inventor: Stuart R. Kerr, III, Evansville, Ind.

[73] Assignee: General Electric Company, Pittsfield, Mass.

[21] Appl. No.: 140,083

[22] Filed: Dec. 31, 1987

[51] Int. Cl.$^4$ .................. B05D 3/06; B32B 27/30
[52] U.S. Cl. .................... 428/522; 427/44; 427/54.1; 428/532; 522/89; 522/121; 522/144
[58] Field of Search .............. 427/54.1, 44; 525/533, 525/8; 428/522, 532; 522/89, 121, 144

[56] References Cited

U.S. PATENT DOCUMENTS

| | | | |
|---|---|---|---|
| 3,661,614 | 5/1972 | Bassemir et al. | 427/54.1 |
| 4,188,451 | 2/1980 | Humphrey, Jr. | 428/331 |
| 4,190,681 | 2/1980 | Hall et al. | 427/45.1 |
| 4,197,335 | 3/1980 | Goossens | 427/162 |
| 4,198,465 | 5/1980 | Moore et al. | 428/409 |
| 4,218,294 | 8/1980 | Brack | 427/54.1 |
| 4,222,835 | 9/1980 | Dixon | 427/54.1 |
| 4,264,658 | 4/1981 | Tobias et al. | 427/54.1 |
| 4,384,026 | 5/1983 | Moore et al. | 427/54.1 |
| 4,396,678 | 8/1983 | Olson | 428/412 |

*Primary Examiner*—Janyce Bell
*Attorney, Agent, or Firm*—Spencer D. Conard

[57] ABSTRACT

A novel radiation curable coating composition for thermoplastic substrates contains a polyfunctional acrylic monomer, a mono-, di- or trifunctional acrylic monomer, a thermoplastic or elastomeric polymer and a photoinitiator. The coatings can be cured to hard, abrasion resistant coatings, yet retain a significant degree of residual unsaturation. The residual unsaturation and the thermoplastic or elastomeric polymer provide excellent adhesion between the coating and topcoats.

24 Claims, 6 Drawing Sheets

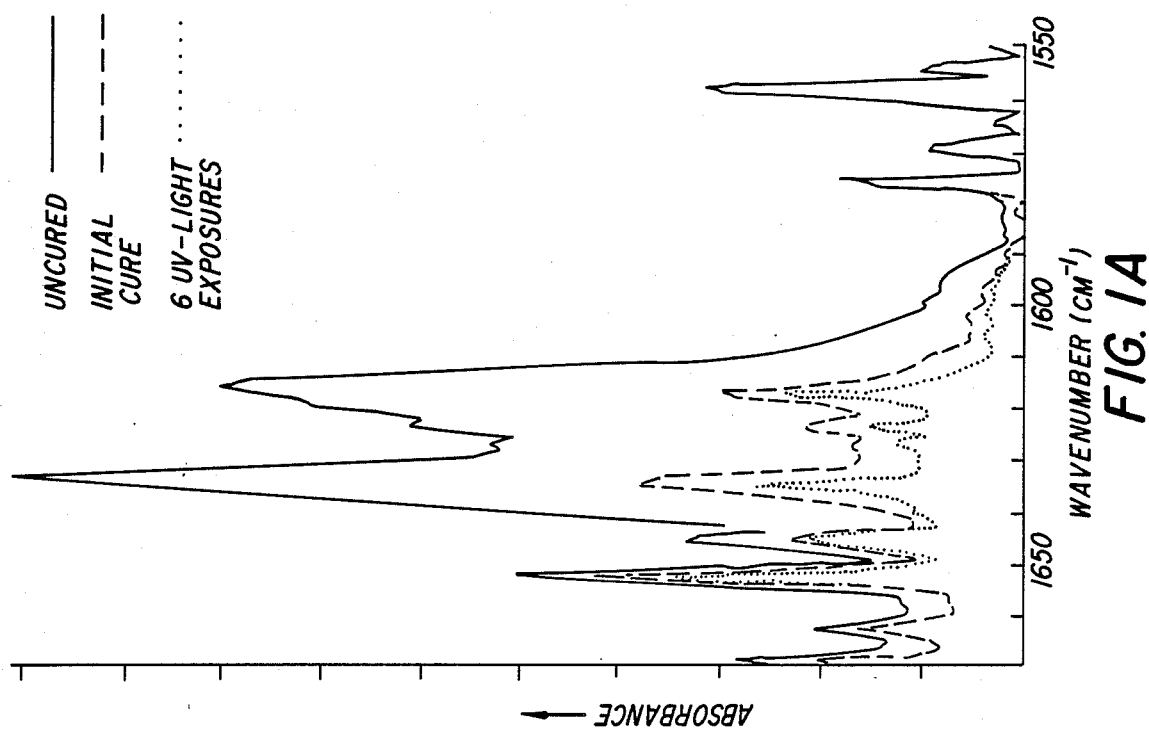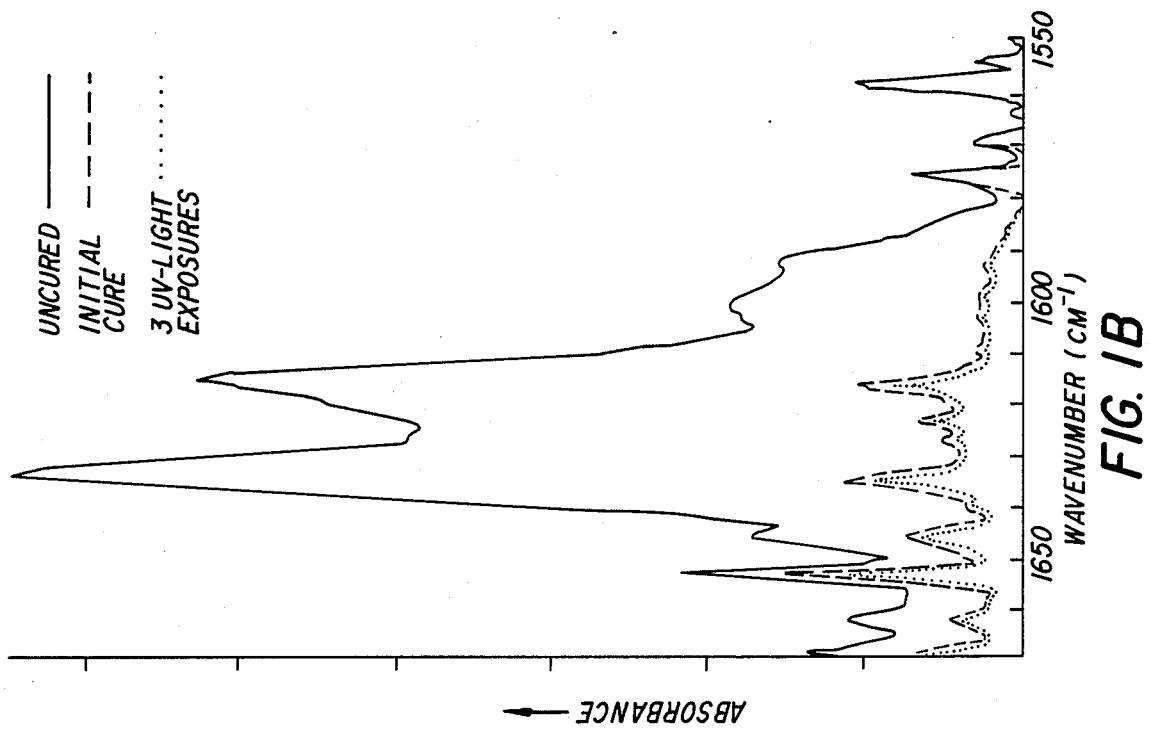

RADIATION-CURABLE COATING FOR THERMOPLASTIC SUBSTRATES

BACKGROUND OF THE INVENTION

This invention relates to radiation curable coatings for thermoplastic substrates. More particularly, the invention relates to UV-curable acrylic coating compositions and processes for coating thermoplastics, such as polycarbonates, with such coatings.

Thermoplastic sheets and film, such as those made from polycarbonates, polyestercarbonates, polystyrene, polyester and the like, find a wide variety of applications in the construction of interior and exterior signs, building materials, automotive and aircraft parts, and appliance parts, to name but a few. It is frequently desirable that the thermoplastic substrate have a glossy surface finish substantially devoid of ripples, scratches and other imperfections. On a commercial scale, obtaining such a surface finish on an untreated, extruded sheet or film is difficult. Moreover, the surfaces of untreated thermoplastic sheets and film are typically somewhat soft and easily scratched or marred and may exhibit a low chemical resistance.

To overcome these problems, thermoplastic substrates are often coated with a transparent protective coating. These coatings are designed to impart abrasion and chemical resistance to the substrates and may contain an ultraviolet light-absorbing compound to stabilize the substrate against UV-catalyzed degradation. A wide variety of such coating compositions have been proposed. Particularly useful coatings are based upon UV-curable acrylic polymer systems. For example, U.S. Pat. No. 198,465 to James E. Moore, et al., describes a polycarbonate article having a mar, abrasion and chemical resistant UV-cured coating comprised of the photoreaction products of certain polyfunctional acrylate monomers and resorcinol monobenzoate as a UV absorber. U.S. Pat. No. 4,188,451 to James S. Humphrey, Jr., describes a procedure for coating polycarbonate substrates which first uses a primer layer of a UV-cured polyfunctional acrylic ester monomer and an organic silicon compound and a top coating of a thermoset silica-filled organopolysixolane. U.S. Pat. No. 4,190,681 to Walter L. Hall, et al., describes a procedure for coating polycarbonate substrates with a primer coating comprised of the photoreaction products of certain polyfunctional acrylic monomers, and thereafter vapor depositing a thin glass top layer to the acrylic-coated substrate.

Thermoplastics are finding increasing applications in fields where thin-gage metals and other materials were previously used. For example, polycarbonate sheets are being used for the fabrication of appliance parts, automotive instrument panels, signs and the like. These applications often require the application of graphic arts or printing on the surface of the thermoplastic substrate. Commonly used inks and graphics materials (so-called "topcoats") are themselves UV-curable polymeric systems. A troublesome feature of acrylic-coated thermoplastics is that their surface is highly crosslinked and relatively inert; therefore, topcoats often do not adhere strongly to such surfaces.

A need exists for a coating composition for thermoplastic substrates, particularly polycarbonates, which imparts good abrasion and chemical resistance, and which also provides a surface for strong bonding of UV-curable topcoats.

SUMMARY OF THE INVENTION

In accordance with the present invention, a novel radiation-curable coating composition for thermoplastic substrates contains:
(a) a polyfunctional acrylic monomer having a degree of functionality of at least about 4;
(b) an acrylic monomer having a degree of functionality of 3 or less;
(c) an acrylic monomer-soluble, acrylic polymercompatible, thermoplastic or elastomeric polymer, having a molecular weight greater than about 2,000; and
(d) a polymerization-initiating amount of a polymerization initiator;
wherein the polyfunctional acrylic monomer is used at a concentration sufficient to impart a topcoat-binding degree of surface unsaturation to the coating when cured to a hard-durable surface, and wherein the thermoplastic polymer is in a surface-plasticizing amount.

The coating compositions of this invention can be applied to thermoplastc articles, such as polycarbonates and polyestercarbonates. They impart a glossy, high quality surface to the thermoplastic, which exhibits excellent abrasion and chemical resistance. A particularly attractive feature of these coatings is that they form a strong bond with conventional UV-curable topcoats.

DETAILED DESCRIPTION OF THE INVENTION

Figure 2:
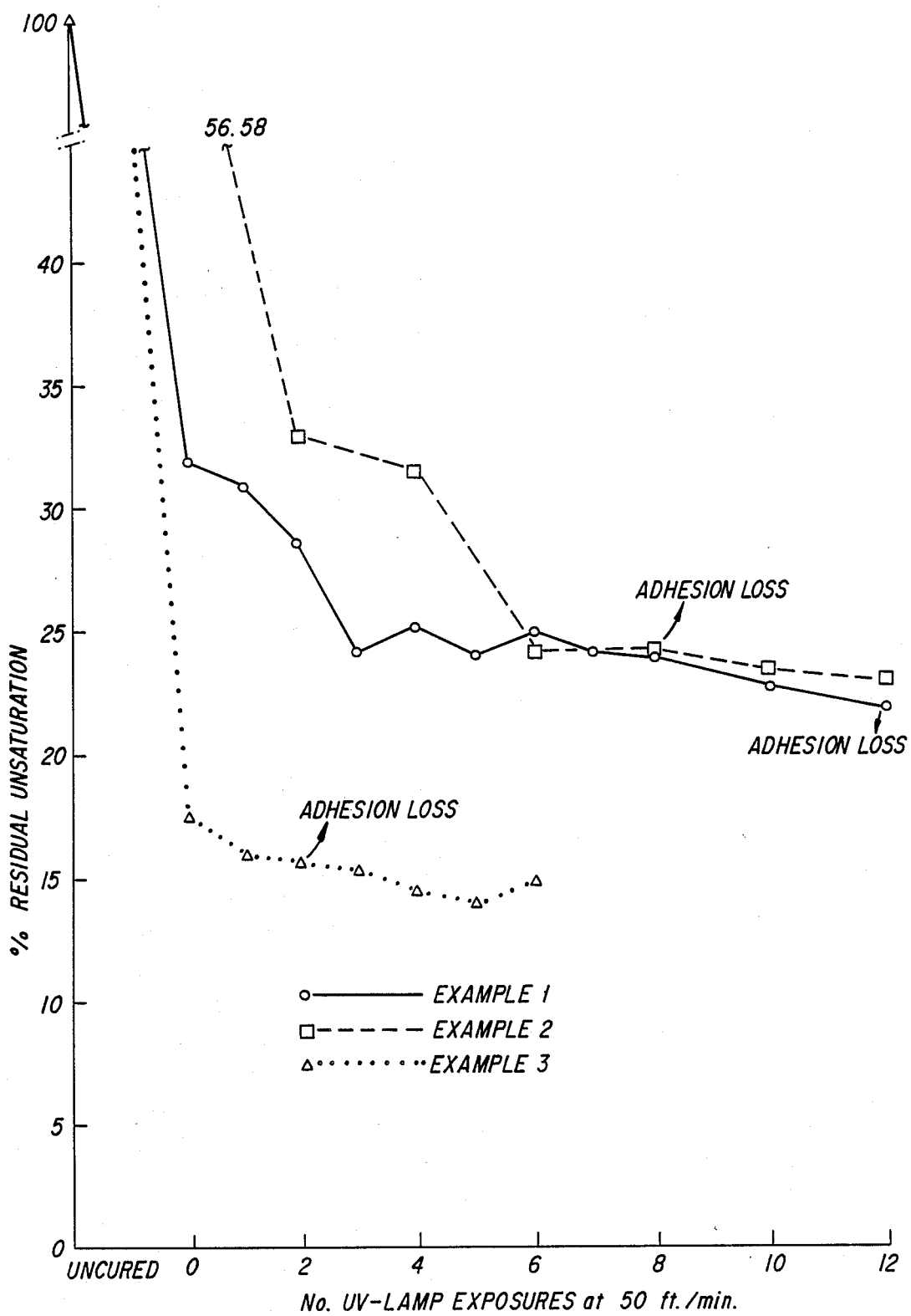

The coating compositions of this invention employ a combination of (a) highly functionalized cross-linking acrylic monomer for imparting a high degree of residual unsaturation (b) a mono-, di- or trifunctional acrylic monomer as a solvent, a diluent and a further crosslinking agent. It has been found that these compositions can be cured to hard, durable surfaces, yet maintain a residual level of surface unsaturation. This residual level of surface unsaturation provides a relatively reactive surface for reacting with and binding UV-curable topcoats, such as inks, paints, lacquers and the like.

Without being bound to any particular theory, the highly functionalized acrylic monomers are believed to provide a sufficient amount of functionality for a highly cross-linked, tough, durable coating, even when the radiation curing is terminated before all of the acrylic-groups have reacted. Indeed, because the polymer reacts to a solid, rigid matrix before all of the acrylic groups have reacted, the degree of residual unsaturation can be easily controlled, simply by controlling the intensity and duration of the radiation cure.

Notwithstanding the residual surface unsaturation in these coatings, their highly cross-linked character produces a hard abrasion and chemical resistant coating. These coatings have also been found to adhere strongly to the thermoplastic substrate and to have a glossy surface substantially free of imperfections.

In addition to the acrylic monomers, the coatings of this invention also contain the substantially nonreactive thermoplastic. By "nonreactive," it is meant that the thermoplastic is substantially free of functional groups which cross-link or otherwise react with the acrylic groups during curing. A primary function of the thermoplastic polymer is to plasticize the substantially thermoset, cross-linked acrylic coating. This plasticization imparts a toughness and flexibility to the coating which would not otherwise be present in such a highly cross-linked polymer. Surprisingly, it has also been discovered that the thermoplastic polymer contributes to the ability of the coating to bind UV curable topcoats. The mechanism for this effect is not well understood. Without being bound to a theory, it is believed that during UV curing of the topcoat, the thermoplastic polymer softens or plasticizes to some extent to permit penetration of the topcoat into the surface. The degree of penetration may be affected by the compatibility of the topcoat monomer species with the thermoplastics. This softening or plasticization acts to relieve the rigidity of the highly cross-linked acrylic polymers, thus facilitating the formation of both physical and covalent bonds between the components of the topcoat and the components of the thermoplastic coating.

The thermoplastic serves the additional functions of relieving internal stresses within the cross-linked coating matrix and inhibiting shrinkage, cracking, crazing and the like. Shrinkage is also inhibited simply because the thermoplastic provides non-shrinking bulk to the coating.

Although the present coatings are particularly suited for the application of UV-curable topcoats, the thermoplastic component also improves penetration and adhesion of solvent-based topcoats.

The mono- or di- or trifunctional acrylic monomers serve several functions in the coating compositions. They act as solvents for the polyfunctional acrylic monomers and the thermoplastic monomer, thus providing a liquid coating composition which can be applied to the substrate using conventional techniques and equipment. The mono-, di- and trifunctional acrylic monomers also provide reactive functional groups which contribute to the cross-linking and polymerization of the coating. Since these monomers have a lower overall functionality than the polyfunctional acrylic monomers. A polymer having a lower degree of cross-linking is somewhat more flexible than one based entirely on highly functionalized acrylic monomers.

Polyfunctional acrylic monomers that can be used in the compositions of this invention are preferably acrylic acid esters of polyhydric alcohols. In general, the polyfunctional acrylic monomers have a degree of functionality of 4 or greater, preferably from about 4 to about 6. By "degree of functionality" is meant the number of acrylic vinyl groups per molecule. Such polyfunctional acrylic monomers include reaction products of acrylic acid with pentaerythritol, dipentaerythritol, tripentaerythritol, ditrimethylolpropane and tritrimethylolpropane. Examples of such reaction products include dipentaerthritol pentaacrylate, pentaerythritol tetraacrylate, ditrimethylolpropane tetraacrylate, tritrimethylolpropane pentaacrylate, and the like or mixtures thereof.

The polyfunctional acrylic monomer is used in an amount sufficient to provide a hard, abrasion resistant coating while still leaving a significant degree of surface unsaturation. The actual concentration of the polyfunctional acrylic monomer will vary depending upon the particular monomer used, the amount and nature of the mono-, di- or trifunctional acrylic monomers used, the nature of the thermoplastic polymer and the degree of unsaturation desired. These amounts can be determined empirically based on hardness and abrasion tests and the surface unsaturation analysis described below. In general, the compositions will contain from about 5% to about 50% by wt. of the polyfunctional acrylic monomer, based upon the total weight of the coating composition exclusive of the polymerization initiator. Preferred compositions contain from about 8% to about 20% by wt. of the polyfunctional acrylic monomer, based upon the total polymer content of the composition.

The mono-, di- and trifunctional acrylic monomers that may be used in this invention include any of the well-known compounds conventionally used in acrylic coatings. Since these monomers act as the solvent system for the coating composition, they preferably are liquids (at the temperatures employed for the coating operations), and are good solvents for the other reactants. In general, mono-, di- and trifunctional acrylic monomers are excellent solvents. Examples of such mono-, di and trifunctional acrylic monomers include $C_1$–$C_6$ alkyl acrylates, $C_3$–$C_8$ cycloalkyl acrylates, $C_1$–$C_6$ alkylene di- or triacrylates, $C_3$–$C_8$ cycloalkylene di- or triacrylates, polyether di- or triacrylates, wherein the polyether group contains from 2 to about 6 carbon atoms, and mixtures thereof. These mono-, di- and triacrylates may optionally be substituted with groups that do not deleteriously affect the solvent properties of the monomer or interfere with the polymerization reaction. Examples of such groups include halogen atoms, hydroxyl groups, lower alkoxy groups, amino groups, carbonyls and the like. Preferred mono-, di- and trifunctional acrylic monomers include methylacrylate, ethyl acrylate, propyl acrylate, ethylene glycol diacrylate, propylene glycol diacrylate, hexanediol diacrylate, hexanetriol triacrylate and the like and mixtures thereof.

The concentration of the mono-, di- or trifunctional acrylate monomer in the composition will vary, depending upon the properties desired and the nature of the other ingredients. High concentrations of monofunctional acrylic monomers will reduce the overall cross-linking of the polymer and result in a more flexible, thermoplastic coating, whereas using an equivalent amount of difunctional or trifunctional acrylic monomer will increase the cross-link density of the cured coating, resulting in a coating having more of a thermoset nature and a higher degree of hardness and abrasion resistance. In general, the concentration of the mono-, di- or triacrylic monomer ranges from about 10 to about 94% by wt. of the total weight of the composition exclusive polymerization initiator. Preferably, the composition contains from about 30 to about 89% by wt. of the mono- or difunctional acrylic monomer, based on the total weight of the composition of polymerization initiator.

A wide range of the thermoplastic polymers may be employed in the present compositions. Such thermoplastic polymers are soluble in the monomer solutions and are used in an amount which results in a viscosity of the coating composition which is convenient for automated coating operations. In general, the viscosity of the coating composition should range between about 50 and about 50,000 centipoise, preferably between about 200 and about 10,000 centipoise. The thermoplastic polymer should be substantially nonreactive with other components of the composition it is also desirable that the thermoplastic polymer exhibit a high level of compatibility with the acrylic polymer photoreaction products. This compatibility is important to achieve a clear, defect-free coating composition. Compatibility can easily be determined empirically, because incompatible polymers will be insoluble in the liquid monomers and/or upon curing will form either hazy films or will tend to exude, bloom or bleed with time. It has generally been found that to impart the plasticizing and topcoat-binding properties desired, the thermoplastic polymer advantageously has a molecular weight greater than about 2,000. Higher molecular weights, up to the solubility limit of the polymer, can be used, provided that the viscosity of the coating composition is acceptable. Preferred thermoplastic polymers have molecular weights ranging from about 10,000 to about 100,000.

Examples of thermoplastic polymers which may be used in this invention include various cellulosic derivatives such as cellulose acetate, cellulose propionate, cellulose acetate propionate, cellulose acetate butyrate, polystyrene, polyethylenephthalate, polybutylenephthalate, polycarbonate, and the like. A particularly preferred thermoplastic is cellulose acetate butyrate. Elastomers may also be used in these compositions. Such elastomers include, for example, natural rubber, styrene-butadiene-styrene, acrylonitrile-butadiene-styrene, styrene-isoprenestyrene, and the like and mixtures thereof.

The thermoplastic polymer is employed in a surface-plasticizing amount. By "surface-plasticizing amount" is meant an amount which imparts a flexibility and toughness to the surface coating, which reduces shrinkage, and which contributes to the adhesion of topcoats to the cured coating. The concentration of the thermoplastic polymer generally ranges from about 1% to about 30% by wt., preferably from about 3% to about 20% by wt. of the total weight of the composition exclusive of the polymerization initiator.

These coating compositions also contain a polymerization-initiating amount of a polymerization initiator. Various radiation initiators may be employed, such as ultraviolet radiation initiators. UV photoinitiators are preferred, and are generally employed in an amount ranging from about 0.01% to about 10% by wt., preferably from about 1% to about 5% by wt. of the composition. Such photoinitiators are well-known and include, for example, ketones, such as benzophenone, acetophenone, benzil, benzylmethylketone, benzoins, and substituted benzoins, such as benzoinmethylether, alphahydroxymethyl benzoin, isopropyl ether, halogen containing compounds, such as alpha-bromoacetophenone, para-bromoacetophenones, alpha-chloromethylnaphthalene and the like.

The concentration of the polyfunctional acrylic monomer ranges from about 5 to about 50% by weight of the composition, the concentration of the thermoplastic polymer ranges from about 1 to about 30% by weight of the composition, and the concentration of the mono-, di- or trifunctional acrylate ranges from about 10 to about 94% by weight of the composition, exclusive of the polymerization initiator. Preferably, the concentration of the polyfunctional acrylic monomer ranges from about 8 to about 20% by weight of the composition, the concentration of the thermoplastic polymer ranges from about 3 to about 20% by weight of the composition, and the concentration of the mono-, di or trifunctional acrylic monomer ranges from about 30 to about 89% of the composition, exclusive of the polymerization initiator.

The coating compositions of this invention may also optionally contain various other additives and fillers, such as flatting agents, surface active agents, thixotrotic agents, and UV light absorbers. All of these additives and the use thereof are well-known in the art and do not require extensive discussions.

In preparing the compositions of this invention, the components are combined and blended until a one-phase, true solution is formed. The order of addition of the ingredients is not critical. An organic solvent can be used to reduce the viscosity of the composition. Such solvent, if used, should be volatile enough that it evaporates prior to any deleterious effect on the thermoplastic substrate. Such solvents include, for example alcohols, lower alkylethers and the like. The solvents are generally those which are substantially non-aggressive toward the thermoplastic substrate. It is preferred that the mono-, di- or trifunctional acrylic monomer be the sole solvent for the composition.

The compositions may be applied to the thermoplastic substrate by any of the well-known procedures. In general, a thin, uniform coating of the composition is applied to the surface of the thermoplastic by dipping, spraying, roll-coating and the like. The coating is then cured, preferably in an inert (e.g., nitrogen) atmosphere by irradiation. In those compositions employing a UV-sensitive photoinitiator, the coating is irradiated with light at a wavelength ranging from about 1800 A. to about 4000 A. The lamp systems used to generate such radiation can consist of ultraviolet lamps, including discharge lamps, such as xenon, metallic halide, metallic arc, e.g., low or high pressure mercury vapor discharge lamps, etc. having operating pressures of from as low as a few milli-torr up to about 10 atmospheres. By "curing" is meant both polymerization of the acrylic monomers and cross-linking to form a hard, nontacky surface. The cured coating layer advantageously has a thickness of from about 0.1 mils to about 10 mils, preferably from about 0.2 mils to about 5 mils.

As discussed above, if a UV-curable topcoat is to be applied to the coating, the coating is cured to hard, non-tacky surface which still contains residual unsaturation. The degree of residual unsaturation may vary, depending upon the type of topcoat to be applied and the nature of the acrylic coating composition, but in general, it ranges from about 5 to about 50%, as determined by the infrared analysis procedure described below. Preferred cured coatings have a degree of residual unsaturation ranging from about 15 to about 40%.

The invention is further illustrated by the following examples, which are not intended to be limiting. Compositions in accordance with the present invention were prepared and coated onto polycarbonate panels. The coatings were cured and tested for residual surface unsaturation, topcoat adhesion, abrasion resistance, hardness and chemical resistance. The properties of the compositions were compared to conventional acrylate-based UV-curable coatings.

The residual surface unsaturation of the coatings was analyzed by the following procedure: infrared spectra of coated film samples were obtained using a Nicolet MX-1 fourier transform infrared ("FTIR") spectrometer operating at two cm-1 resolution. The coating surface analyses were performed using a multiple internal reflectance ("MIR") technique. On each sample, 64 scans were made, and the average spectrum was computed and plotted as absorbance versus wave number. An absorbance band corresponding to the reactive acrylate double bond was visually identified as 1636 cm-1. This band was chosen, because it represents absorption attributable to the fundamental vibration characteristic of the C=C stretch for multifunctional acrylate monomers. This band is also in a region relatively clear of other interferring sources of absorption, thus making background estimates more reliable.

The degree of cure for the coating surface was monitored by measuring the absorbance at 1636 cm$^{-1}$ as a function of the number of UV cure processing steps. Variations in coated film to MIR crystal interfacial content were compensated for by normalizing the acrylate absorbance to a band which remains essentially constant during the UV curing. A band at 1559 cm$^{-1}$ was used as this "internal standard."

The relative absorption, $A_R$, was defined as $$A_R = \frac{A_{1636}}{A_{1559}}$$

where $A_{1636}$ is the absorbance at 1636 cm$^{-1}$ and $A_{1559}$ is the absorbance at 1559 cm$^{-1}$. The relative absorbance, as a function of the degree of surface cure, was then used to obtain the percent residual unsaturation curve, % RU, which was determined by the formula $$\% RU = \frac{A_R}{A_{RO}} \times 100\%$$

where $A_{RO}$ is the relative absorbance of the uncured coating.

It is assumed that initially (i.e., for the uncured coating), the degree of residual unsaturation is 100%, and that the base line absorbance at 1636 cm$^{-1}$ represents the theoretical 0% residual unsaturation for a fully reacted system. FIG. 1 of the drawings shows two sets of infrared spectra of acrylic coatings on polycarbonate film. The spectra of a currently used acrylic coating, as described in Example 3 below, are shown in FIG. 1B, and spectra of a coating according to the present invention, as described in Example 1 below, are shown in FIG. 1A. FIG. 1B shows spectra of uncured coating, coatings subjected to an initial radiation curing step and a spectrum of a coating subjected to three UV light exposures. FIG. 1A shows a spectrum of the uncured coating, a spectrum of a coating receiving an initial cure, and a spectrum of a coating after six UV light exposures. These figures illustrate that the peak at 1636 cm$^{-1}$ decreases as the acrylic coatings are cured. The figures also illustrate that the level of residual unsaturation may be more easily controlled in the coatings of the present invention than those of the prior art coatings.

The percentage of acrylic reactive sites is calculated to represent the degree of possible acrylate conversion, assuming that a point exists where no further reaction is dimensionally possible. This point is determined by the minimum calculated % residual unsaturation (% RU$_{min.}$), whereby further lamp irradiation induces no further reaction. % Acrylate reactive sites (% ARS) is thus defined as $$\% ARS = \frac{\% RU - \% RU_{min.}}{100\% - \% RU_{min.}}$$

The cross hatched adhesion test was performed by cutting parallel grooves through the topcoat and the coating into the substrate with a multi-bladed tool. The sample was then rotated 90³ and the cutting repeated. This procedure left a grid pattern of 1 mm squares cut into the coating. An adhesive tape was applied over the cross-hatched area and quickly pulled off. A sample fails the adhesion test if any of the squares are pulled off.

The Taber abrasion test is performed by subjecting test panels, having a ¼" diameter hole cut in their center, to a Taber abraser. The Taber abraser is equipped with CS-10F wheels which are resurfaced every 200 cycles by abrading for 25 cycles on a 5-111 refacing disc. 500 gram weights were used in combination with the CS-10F wheels. Initial measurements of percent haze were made at four places around the wear track of the sample using a Gardner Hazemeter. The sample was abraded for 100 cycles, cleaned with isopropanol, and the percent haze was remeasured at the same four places. The four differences in percent haze were calculated and averaged to give the Δ% haze.

The pencil hardness test was performed by mounting finely sharpened pencils of varying standard hardnesses into a small sled-like apparatus and drawing them across the coated test panels. The hardness number of the softest pencil lead which scribed a mark in the coating was recorded.

EXAMPLES 1-4

Three experimental acrylic coating compositions having the ingredients and concentrations set forth in Table I were prepared. These coating compositions were coated onto 0.15 inch gauge Lexan ® polycarbonate film. The coated films were prepared on a UV-cured laboratory line coating apparatus using 1'300 watt electrodeless UV emitter with a line speed of 22.6 feet/minute. Coating thickness was determined to be 0.52 mils as measured by spectral transmission interference curves. For comparison purposes, a commercial Lexan ® film coated with an acrylate coating designated MR-3000 (identified in Table 1) was used.

Topcoat texturing was carried out by silk screening onto the coated polycarbonate film. Norcote ® C12 onto the coated polycarbonate film. Norcote ® UV-curable texture topcoat, using 305 mesh polyester fabric, was employed. Film samples were cured at 50/minute using the Linde photocure system, PS-2000-2H, with both lamps on at 200 watts/1-i. The cure chamber was not purged with nitrogen. Tables 2-4 summarize the results of the tests on these coated films. The tables provide the relative absorbances, $A_R$, percent residual unsaturation, % RU, Acrylate Reactive Sites, % Taber hazes (100 cycles), pencil hardness, and texture topcoat cross-hatch adhesion strength. Cure data was calculated for differing degrees of coating cure as measured by the number of UV lamp exposures, additionally given for conventional cured hard coated film samples.

TABLE I

| Components | Example 1 | Example 2 | Example 3 | Example 4 |
|---|---|---|---|---|
| CAB5 381-.5[1] | 8.6 | 4.3 | — | — |
| HDDA[2] | 37.3 | 39.0 | 46.7 | 40.8 |
| TMPTA[3] | 37.3 | 39.0 | 46.5 | 40.8 |
| DiPEP$_5$A[4] | 14.7 | 15.5 | — | 16.1 |
| DEAP[5] | 2.1 | 2.2 | 1.9 | 2.3 |
| RMB[6] | — | — | 4.7 | — |

[1]Cellulose Acetate Butyrate Resin
[2]Hexanediol Diacrylate
[3]Trimethylolpropane Triacrylate
[4]Dipentaerythritol Pentaacrylate
[5]Diethoxyacetophenone
[6]Resorcinol Monobenzoate

TABLE 2

Cure Data for the Coating of Example 1 vs. No. Lamp Exposures @ 50 Ft./Min.

| No. Lamp Exposures @ 50 ft/min | $A_{1634}$ | $A_{1559}$ | $A_R$ | % RU | % Acrylate Reactive Sites | % Taber Haze (100 Cycles) | Pencil Hardness | X-Hatch Adhesion (Texture) Topcoat |
|---|---|---|---|---|---|---|---|---|
| Uncured | 1.668 | 0.547 | 3.049 | 100.00 | 100.00 | — | — | — |
| 0 | 0.102 | 0.105 | 0.971 | 31.85 | 12.95 | 6.7 | 6H | Pass |
| 1 | 0.142 | 0.151 | 0.940 | 30.83 | 11.65 | 5.9 | 7H | Pass |
| 2 | 0.096 | 0.110 | 0.873 | 28.63 | 8.84 | 5.0 | 7H | Pass |
| 2+[a] | 0.102 | 0.128 | 0.797 | 26.14 | 5.66 | 4.8 | 7H | Pass |
| 3 | 0.118 | 0.160 | 0.738 | 24.20 | 3.18 | 5.0 | 7H | Pass |
| 4 | 0.105 | 0.137 | 0.766 | 25.12 | 4.36 | 4.9 | 8H | Pass |
| 5 | 0.088 | 0.120 | 0.733 | 24.04 | 2.98 | 4.4 | 8H | Pass |
| 6 | 0.076 | 0.100 | 0.760 | 24.92 | 4.10 | 4.2 | 8H | Pass |
| 7 | 0.090 | 0.122 | 0.738 | 24.20 | 3.18 | 4.8 | 8H | Pass |
| 8 | 0.099 | 0.136 | 0.728 | 23.88 | 2.77 | 4.8 | 8H | Pass |
| 10 | 0.109 | 0.157 | 0.694 | 22.76 | 1.34 | 4.9 | 8H | Pass |
| 12 | 0.091 | 0.136 | 0.669 | 21.94 | 0.29 | 4.8 | 8H | 30% Failure |
| 14 | 0.089 | 0.134 | 0.664 | 21.78 | 0.09 | 4.8 | 8H | 100% Failure |
| 16 | 0.100 | 0.151 | 0.662 | 21.71 | 0.00 | 4.7 | 8H | 100% Failure |

[a]Given an additional 32 backside lamp exposures @ 50 ft./min.

TABLE 3

Cure Data for the Coating of Example 2 vs. No. UV-Lamp Exposures @ 50 Ft./Min.

| No. Lamp Exposures @ 50 ft/min | $A_{1636}$ | $A_{1559}$ | $A_R$ | % RU | % Acrylate Reactive Sites | X-Hatch Adhesion Texture Topcoat |
|---|---|---|---|---|---|---|
| Uncured | 0.686 | 0.255 | 2.690 | 100.00 | 100.00 | — |
| 0 | 0.137 | 0.090 | 1.522 | 56.58 | 25.76 | Pass |
| 2 | 0.094 | 0.106 | 0.887 | 32.97 | 7.60 | Pass |
| 4 | 0.089 | 0.105 | 0.848 | 31.52 | 6.48 | Pass |
| 6 | 0.111 | 0.170 | 0.653 | 24.28 | 0.92 | Pass |
| 8 | 0.139 | 0.212 | 0.656 | 24.39 | 1.00 | 5% Failure |
| 10 | 0.101 | 0.161 | 0.627 | 23.31 | 0.17 | 50% Failure |
| 12 | 0.261 | 0.420 | 0.621 | 23.09 | 0.00 | 100% Failure |

TABLE 4

Cure Data for the Coating of Example 3 vs. No. Lamp Exposures @ 50 Ft./Min.

| No. Lamp Exposures @ 50 ft/min | $A_{1636}$ | $A_{1559}$ | $A_R$ | % RU | % Acrylate Reactive Sites | % Taber Haze (100 Cycles) | Pencil Hardness | X-Hatch Adhesion (Texture Topcoat) |
|---|---|---|---|---|---|---|---|---|
| Uncured | 0.523 | 0.102 | 5.127 | 100.00 | 100.00 | — | — | — |
| 0 | 0.074 | 0.083 | 0.892 | 17.40 | 3.69 | 8.4 | F | Pass |
| 1 | 0.090 | 0.111 | 0.811 | 15.82 | 2.01 | 7.9 | H | Pass |
| 1+[a] | 0.102 | 0.111 | 0.919 | 17.92 | 4.24 | 8.0 | H | Pass |
| 2 | 0.081 | 0.101 | 0.802 | 15.64 | 1.82 | 8.0 | 2H | 50% Failure |
| 3 | 0.099 | 0.127 | 0.780 | 15.21 | 1.37 | 7.7 | 3H | 100% Failure |
| 4 | 0.097 | 0.132 | 0.735 | 14.34 | 0.44 | 7.2 | 3H | 100% Failure |
| 5 | 0.095 | 0.133 | 0.714 | 13.93 | 0.00 | 6.3 | 3H | 100% Failure |
| 6 | 0.101 | 0.132 | 0.765 | 14.92 | 1.05 | 6.7 | 3H | 100% Failure |

[a]Given an additional 32 backside lamp exposures

Figure 3:
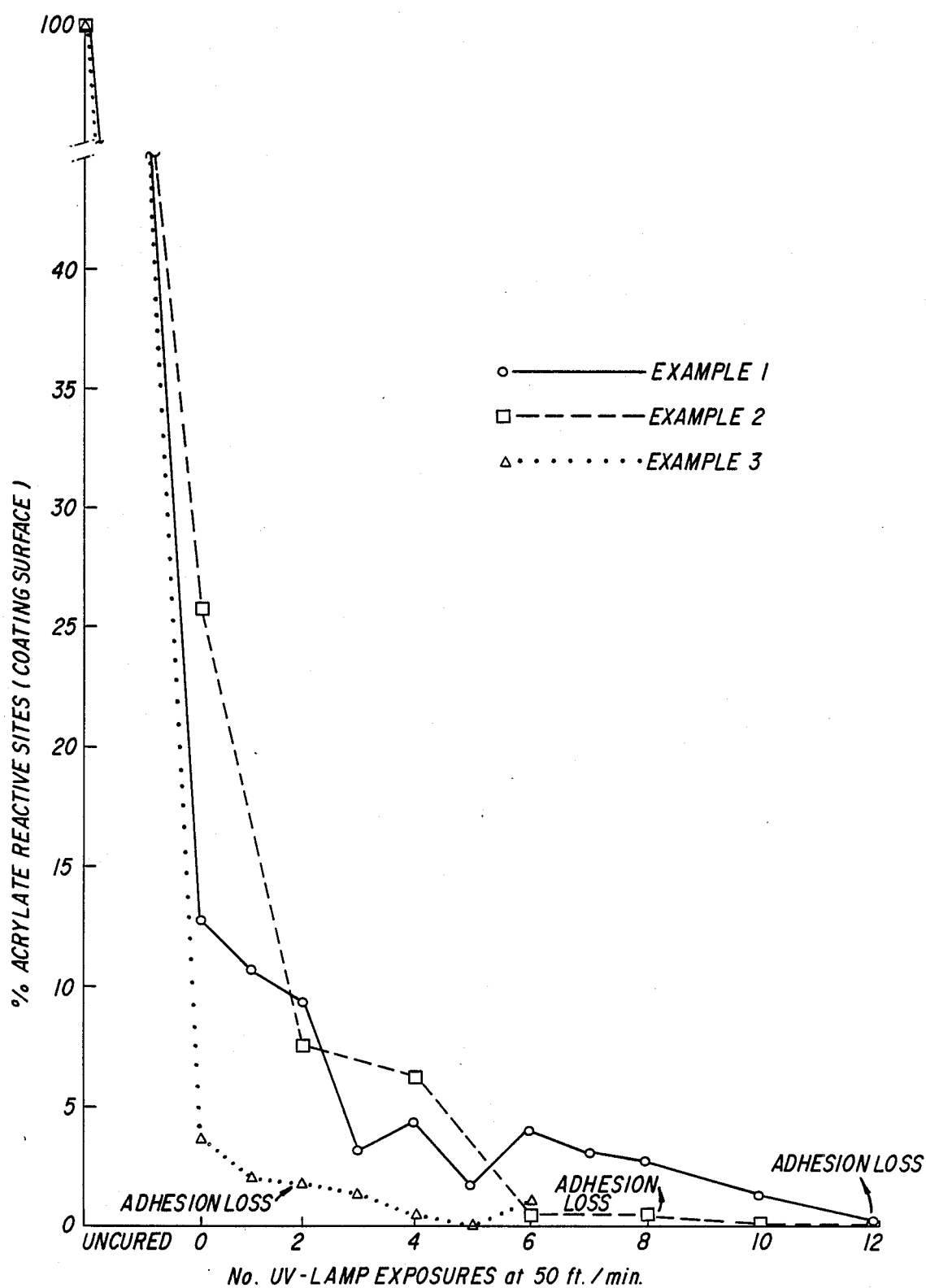
Figure 4:
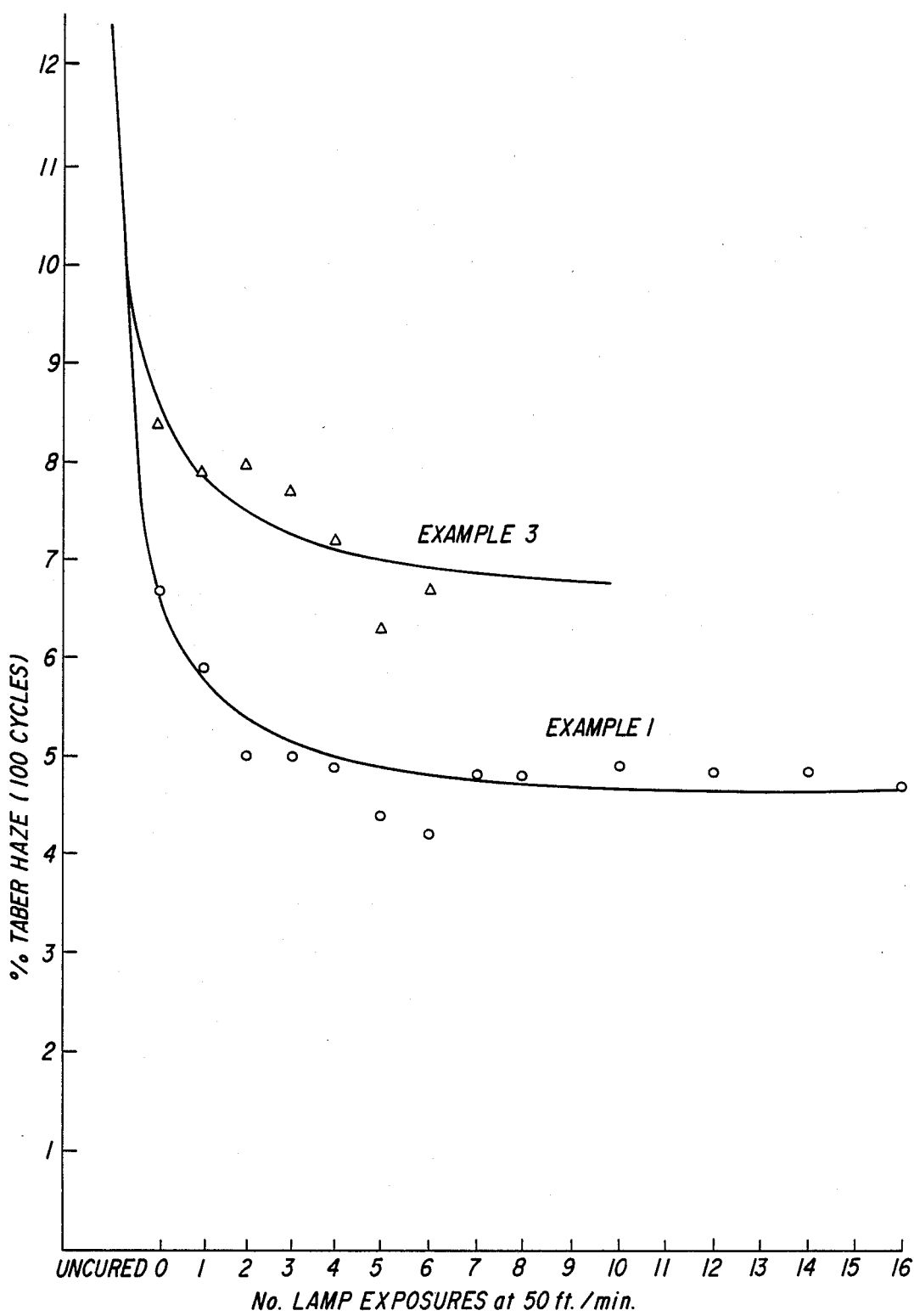
Figure 5:
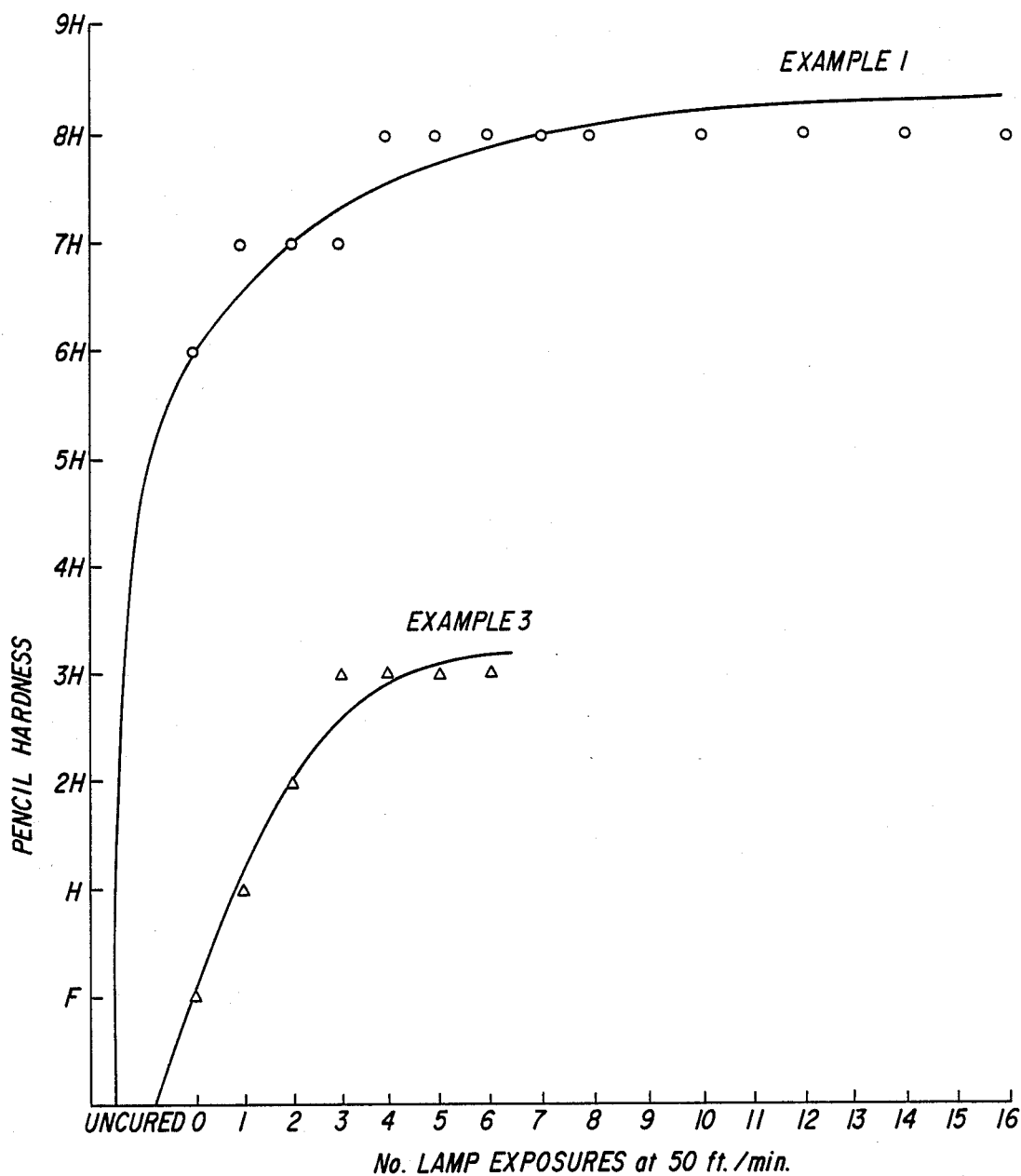
Figure 6:
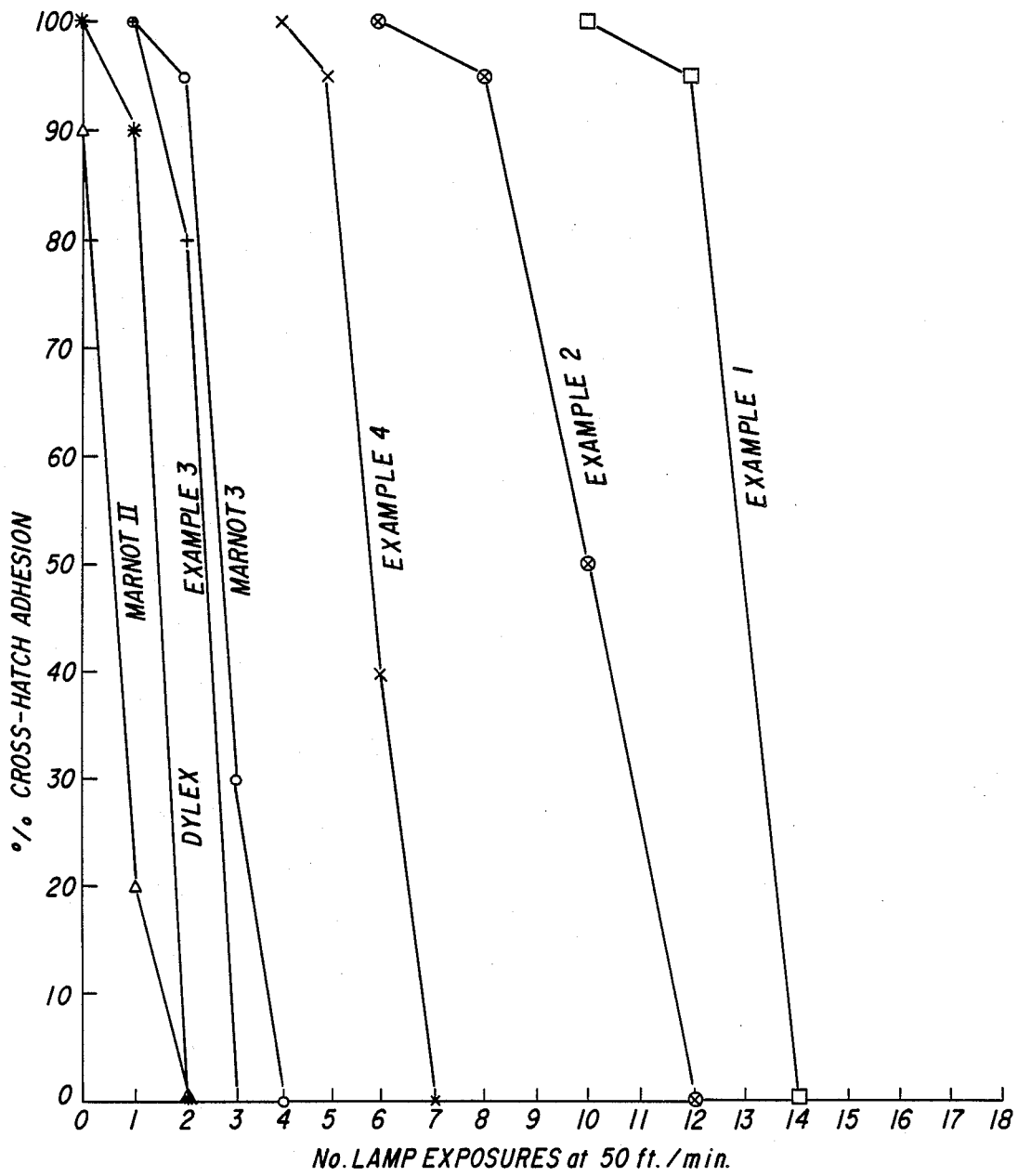

FIG. 2 is a plot of the calculated percent residual unsaturation for the three coatings versus the number of lamp exposures. The number of lamp exposures resulting in loss of texture topcoat adhesion is also indicated on the curves. FIG. 3 is a plot of the calculated percent acrylate reactive sites for the three coatings versus the number of UV lamp exposures. Again, the number of exposures resulting in topcoat adhesion loss is noted. FIG. 4 is a plot of the measured percent Taber haze (100 cycles) versus the number of UV exposures for the coating of Example 1 and the conventional coating of Example 3. FIG. 5 plots the pencil hardness versus the number of UV lamp exposures for the coating of Example 1 and the conventional coating of Example 3. FIG. 6 is a plot of the percent cross-hatch adhesion of the NorCote C12 texture topcoat for the coatings of Examples 1, 2, 3 and 4, as well as for three topcoated commercial topcoates, films, sold under the trademarks DYLEX, MARNOT II and MARNOT 3. The DYLEX and MARNOT 3 films are sold as topcoat-printable films.

As can be seen from FIG. 2 the coatings of Examples 2 and 3 show significant reduction of percent residual unsaturation up to 12 additional top cure lamp exposures. From 12 to 16 lamp exposures, % RU is reduced by only 0.23%. Thus, a practical level of radiation induced surface reactivity exists up to 12 lamp exposures. FIG. 3 confirms this observation in terms of the remaining percent acrylate reactive sites. FIGS. 4 and 5 show the improved Taber abrasions and pencil hardness and the coatings of Examples 2 and 3 up to 12 lamp exposures. FIG. 6 shows that the coating is receptive to texture topcoating with 100% cross-hatch adhesion at 10 lamp exposures. FIG. 6 best illustrates the effects of surface reactivity and the thermoplastic polymer on topcoat-adhesion. Even with the compositions of the present invention, losses of adhesion result after 10 lamp exposures and after 14 lamp exposures, full adhesion losses occur. The conventional coatings of Example 3 show a different surface reaction cure response to the overall lamp exposure from 0 to 2 lamp exposures percent RU drops 1.76%. However, from 2 to 6 lamp exposures, percent RU drops only 0.72%. FIGS. 4 and 5 reflect this drop in that Taber abrasion resistances and pencil hardnesses are not improved significantly above 2 lamp exposures. FIG. 6 shows that the conventional coating (Example 3) loses 100% adhesion to textured topcoats after 3 lamp exposures. FIG. 6 also shows the effect of the thermoplastic component on topcoat adhesion (note difference between the coatings of Examples 1 and 4). Commercial topcoated films exhibit relatively poor topcoat adhesion.

I claim:

1. A radiation curable coating composition for a thermoplastic substrate, which comprises:
    (a) a polyfunctional acrylic monomer having a degree of functionality of at least about 4;
    (b) a mono-, di-, or trifunctional acrylic monomer;
    (c) an acrylic monomer-soluble, acrylic polymer compatible thermoplastic polymer, having a molecular weight greater than about 2000; and
    (d) a polymerization initiation amount of a polymerization initiator;
wherein the polyfunctional acrylic monomer is used at a concentration sufficient to impart a topcoat-binding degree of surface unsaturation to the cured coating when cured to a hard, durable coating, wherein the thermoplastic polymer is in a surface-plasticizing amount, wherein the concentration of the polyfunctional acrylate ranges from about 5 to about 50% by wt. of the composition, the concentration of the thermoplastic polymer ranges from about 1 to about 30% by wt. of the composition, and the concentration of the mono- or difunctional acrylate ranges from about 10 to about 94% by wt. of the composition, exclusive of the polymerization initiator, wherein said initiator is employed in an amount ranging from about 0.01% to about 10% by wt. of the composition, and wherein the relative proportions of the polyfunctional acrylate, the mono-, di- or trifunctional acrylate and the thermoplastic polymer are controlled such that, upon curing, the surface of the coating has a degree of unsaturation of from about 5% to about 50%.

2. The coating composition of claim 1, wherein the polyfunctional acrylate is the reaction product of acrylic acid and pentaerythritol, dipentaerythritol, tripentaerythritol, ditrimethylolpropane, or tritrimethylolpropane, and has a degree of functionality of from about 4 to about 6.

3. The coating composition of claim 2, wherein the polyfunctional arcrylic monomer is selected from the group consisting of dipentaerythitol pentaacrylate, pentaerythriol tetraacrylate, ditrimethylolpropane tetraacrylate, trimethylolpropane triacrylate.

4. The coating composition of claim 1, wherein the mono-, di- or trifunctional acrylic monomer is selected from the group consisting of $C_1$–$C_6$ alkylacrylates, $C_3$–$C_8$ cycloacrylates, $C_1$–$C_6$ alkylene di- or triacrylates, $C_3$–$C_8$ cycloalkylene di- or triacrylates; polyether di- or triacrylates, wherein the polyether group contains from 2 to about 6 carbon atoms, and mixtures thereof, wherein each of the above mono-, di- or trifunctional acrylates may optionally be substituted with one or more halogen atoms, hydroxy groups, $C_2$–$C_4$ lower alkoxy groups, amino groups or carbonyls.

5. The coating composition of claim 1, wherein the thermoplastic polymer has a molecular weight ranging from about 10,000 to about 100,000 and is selected from the group consisting of cellulose acetate, cellulose propionate, cellulose acetate butyrate, cellulose acetate propionate, polystryrene, polyethylenephthalate, polybutylenephthalate, polycarbonate, natural rubber, SBS, ABS, SIS and mixtures thereof.

6. The coating composition of claim 1, wherein the degree of unsaturation is from 15% to about 40%.

7. The coating composition of claim 1, wherein the concentration of the polyfunctional acrylic monomer ranges from about 8 to about 20% by wt. of the composition, the concentration of the thermoplastic polymer ranges from about 3 to about 20% by wt. of the composition, and the concentration of the mono- or difunctional acrylic monomer ranges from about 30 to about 89% of the composition, exclusive of the polymerization initiator.

8. The coating composition of claim 7, wherein the polyfunctional acrylic monomer is dipentaerythritol pentaarylate, pentaerythriol tetraacrylate or ditrimethylolpropane tetraacrylate; the mono-, di- or trifunctional acrylic monomer is methyl acrylate, ethyl acrylate, propyl acrylate, ethyleneglycol diacrylate, propyleneglycol diacrylate or hexanetriol triactylate.

9. The coating composition of claim 7, wherein the polyfunctional acrylic monomer is a mixture of dipentaerythritol pentracrylate and trimethylolpropane triacrylate, the mono-, di- or trifunctional acrylic monomer is hexanediol diacrylate, and the thermoplastic polymer is cellulose acetate butyrate.

10. A process for coating a thermoplastic article which comprises the steps of (i) applying a thin coating of a composition comprising:
    (a) a polyfunctional acrylic monomer having a degree of functionality of at least about 4;
    (b) a mono-, di- or trifunctional acrylic monomer;
    (c) an acrylic monomer-soluble, acrylic polymer compatible thermoplastic polymer, having a molecular weight greater than about 2000; and
    (d) a polymerization initiation amount of a polymerization initiator;
wherein the polyfunctional acrylic monomer is used at a concentration sufficient to impart a topcoat-binding degree of surface unsaturation to the cured coating when cured to a hard, durable coating, wherein the thermoplastic polymer is in a surface-plasticizing amount, wherein the concentration of the polyfunctional acrylate ranges from about 5 to about 50% by wt. of the composition, the concentration of the thermoplastic polymer ranges from about 1 to about 30% by wt. of the composition, and the concentration of the mono-, di- or trifunctional acrylate ranges from about 10 to about 94% by wt. of the composition, exclusive of the polymerization initiator, wherein said initiator is employed in an amount ranging from about 0.01% to about 10% by wt. of the composition, and (ii) curing the coating from an amount of radiation sufficient to form a hard, durable coating, yet leave a topcoat binding surface unsaturation, wherein the residual unsaturation of the cured coating ranges from about 5% to about 50% and (iii) curing the coating with radiation.

11. The process of claim 10, wherein the residual unsaturation of the cured coating ranges from about 15% to about 40%.

12. The process of claim 10, wherein the polyfunctional acrylic monomer is selected from the group consisting of dipentaerythritol pentacrylate, pentaerythritol tetraacrylate, ditrimethylolpropane tetraacrylate, trimethylolpropanetriacrylate.

13. The process of claim 16, wherein the mono-, di- or trifunctional acrylic monomer is selected from the group consisting of $C_1$–$C_6$ alkylacrylates, $C_3$–$C_8$ cycloakylacrylates, $C_1$–$C_6$ alkylene di- or triacrylates, $C_3$–$C_8$ cycloalkylene di- or triacrylates; polyether di- or triacrylates, wherein the polyether group containing from 2 to about 6 carbon atoms, and mixtures thereof, wherein each of the above mono-, di- or trifunctional acrylates may optionally be substituted with one or more halogen atoms, hydroxy groups, $C_2$–$C_4$ lower alkoxy groups, amino groups or carbonyls.

14. The process of claim 10, wherein the thermoplastic polymer has a molecular weight ranging from about 10,000 to about 100,000 and is selected from the group consisting of cellulose acetate, cellulose propionate, cellulose acetate butyrate, cellulose acetate propionate, polystyrene, polyethylenephthalate, polybutylenephthalate, polycarbonate, natural rubber, SBS, ABS, SIS and mixtures thereof.

15. The process of claim 10, wherein the relative proportions of the polyfunctional acrylate, the mono- or difunctional acrylate and the thermoplastic polymer are controlled such that, upon curing, the surface of the coating has a degree of unsaturation of from about 5% to about 50%.

16. The process of claim 10, wherein the degree of unsaturation is from 15% to about 40%.

17. The process of claim 10, wherein the concentration of the polyfunction acrylic monomer ranges from about 8 to about 20% by wt. of the composition, the concentration of the thermoplastic polymer ranges from about 3 to about 20% by wt. of the composition, and the concentration of the mono-, di or trifunctional acrylic monomer ranges from about 30 to about 89% of the composition, exclusive of the polymerization initiator.

18. The process of claim 10, wherein the polyfunctional acrylic monomer is dipentaerythritol pentaarylate, pentaerythritol tetraacrylate or ditrimethylolpropane tetraacrylate; the mono-, di- or trifunctional acrylic monomer is methylacrylate, ethylacrylate, propylacrylate, ethyleneglycol diacrylate, or propyleneglycol diacrylate.

19. The process of claim 10, wherein the polyfunctional acrylic monomer is a mixture of dipentaerythritol pentacrylate and trimethylolpropane triacrylate, the mono-, di or trifunctional acrylic monomer is exanedioldiacrylate, and the thermoplastic polymer is cellulose acetate butyrate.

20. A thermoplastic article coated according to the process of claim 10, 11 or 12.

21. A thermoplastic article coated according to the process of claim 20.

22. A thermoplastic article coated according to the process of claim 19.

23. A radiation curable coating composition for a thermoplastic substrate, which consists essentially of:
(a) a polyfunctional acrylic monomer having a degree of functionality of at least about 4;
(b) a mono-, di-, or trifunctional acrylic monomer;
(c) an acrylic monomer-soluble, acrylic polymer compatible thermoplastic polymer, having a molecular weight greater than about 2000; and
(d) a polymerization initation amount of a polymerization initiator;
wherein the polyfunctional acrylic monomer is used at a concentration sufficient to impart a topcoat-binding degree of surface unsaturation to the cured coating when cured to a hard, durable coating, wherein the thermoplastic polymer is in a surface-plasticizing amount, wherein the concentration of the polyfunctional acrylate ranges from about 5 to about 50% by wt. of the composition, the concentration of the thermoplastic polymer ranges from about 1 to about 30% by wt. of the composition, and the concentration of the mono- or difunctional acrylate ranges from about 10 to about 94% by wt. of the composition, exclusive of the polymerization initiator, wherein said initiator is employed in an amount ranging from about 0.01% to about 10% by wt. of the composition, and wherein the relative proportions of the polyfunctional acrylate, the mono-, di- or trifunctional acrylate and the thermoplastic polymer are controlled such that, upon curing, the surface of the coating has a degree of unsaturation of from about 5% to about 50%.

24. The coating composition of claim 23, wherein the thermoplastic polymer has a molecular weight ranging from about 10,000 to about 100,000 and is selected from the group consisting of celluose acetate, cellulose propionate, cellulose acetate butyrate, cellulose acetate propionate, polystyrene, polyethylenephtalate, polybutylenephtalate, polycarbonate, natural rubber, SBS, ABS, SIS and mixtures thereof.

* * * * *